United States Patent
Seta

(10) Patent No.: US 6,483,825 B2
(45) Date of Patent: *Nov. 19, 2002

(54) TIME SYNCHRONIZATION METHOD IN CDMA SYSTEM

(75) Inventor: Mitsuru Seta, Kawasaki (JP)

(73) Assignee: Fujitsu Limited, Kawasaki (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/236,962

(22) Filed: Jan. 25, 1999

(65) Prior Publication Data

US 2002/0054611 A1 May 9, 2002

(30) Foreign Application Priority Data

Jul. 7, 1998 (JP) .............................. 10-191472

(51) Int. Cl.$^7$ ................................ H04B 7/00
(52) U.S. Cl. ...................... 370/335; 370/350; 455/502
(58) Field of Search ................... 370/312, 315, 370/316, 319, 320, 323, 324, 325, 328, 335, 342, 345, 349, 350, 503, 509, 510, 512, 515, 516, 517, 518, 519; 375/140, 141, 145, 146, 147, 149, 367; 455/502, 503

(56) References Cited

U.S. PATENT DOCUMENTS 5,261,118 A * 11/1993 Vanderspool, II et al. .. 455/503
5,423,058 A * 6/1995 Cudak et al. ............... 455/503
5,561,701 A * 10/1996 Ichikawa .................. 455/31.2
5,742,907 A * 4/1998 Brown ....................... 455/503
5,805,983 A * 9/1998 Naidu et al. ............... 455/67.6
5,809,426 A * 9/1998 Radojevic et al. .......... 455/502
5,872,774 A * 2/1999 Wheatley, III et al. ..... 370/335
5,937,357 A * 8/1999 Tanaka ...................... 455/503
6,011,977 A * 1/2000 Brown et al. ............... 455/503

FOREIGN PATENT DOCUMENTS

JP        4-132491      5/1992
JP        8-265838     10/1996

\* cited by examiner

*Primary Examiner*—Kwang Bin Yao
(74) *Attorney, Agent, or Firm*—Katten Muchin Zavis Rosenman

(57) ABSTRACT

A time synchronization method in a CDMA system for synchronizing the time of a plurality of base stations and the time of a base station controller that controls each of these base stations includes providing the base station controller with a GPS receiver for receiving a signal from GPS satellites and generating a reference time based upon the received signal, adopting the reference time generated by the GPS receiver as the time of the base station controller, creating time reference information based upon this time and sending the time reference information to each base station. Each base station synchronizes its own time to the that of the base station controller based upon the time reference information it has received.

7 Claims, 7 Drawing Sheets

FIG.6

| MULTIFRAME NO. | $m_1$ | $m_2$ | $m_3$ | $m_4$ | $m_5$ | $m_6$ | $m_7$ | $m_8$ | $m_9$ | $m_{10}$ | $m_{11}$ | $m_{12}$ |
|---|---|---|---|---|---|---|---|---|---|---|---|---|
| #1 | 1 | 1 | YEAR (THOUSANDS PLACE) | | | | YEAR (HUNDREDS PLACE) | | | | — | — |
| #2 | 0 | 0 | YEAR (TENS PLACE) | | | | YEAR (UNITS PLACE) | | | | — | — |
| #3 | 0 | 0 | MONTH (TENS PLACE) | | | | MONTH (UNITS PLACE) | | | | — | — |
| #4 | 0 | 0 | DAY (TENS PLACE) | | | | DAY (UNITS PLACE) | | | | — | — |
| #5 | 0 | 0 | HOUR (TENS PLACE) | | | | HOUR (UNITS PLACE) | | | | — | — |
| #6 | 0 | 0 | MINUTE (TENS PLACE) | | | | MINUTE (UNITS PLACE) | | | | — | — |
| #7 | 0 | 0 | SECOND (TENS PLACE) | | | | SECOND (UNITS PLACE) | | | | — | — |
| #8 | 0 | 0 | $b_{31}$ | $b_{30}$ | $b_{29}$ | $b_{28}$ | $b_{27}$ | $b_{26}$ | $b_{25}$ | $b_{24}$ | — | — |
| #9 | 0 | 0 | $b_{23}$ | $b_{22}$ | $b_{21}$ | $b_{20}$ | $b_{19}$ | $b_{18}$ | $b_{17}$ | $b_{16}$ | — | — |
| #10 | 0 | 0 | $b_{15}$ | $b_{14}$ | $b_{13}$ | $b_{12}$ | $b_{11}$ | $b_{10}$ | $b_9$ | $b_8$ | — | — |
| #11 | 0 | 0 | $b_7$ | $b_6$ | $b_5$ | $b_4$ | $b_3$ | $b_2$ | $b_1$ | $b_0$ | — | — |
| #12 | 0 | 0 | — | — | — | — | — | — | — | — | — | — |
| ~ | ~ | ~ | ~ | ~ | ~ | ~ | ~ | ~ | ~ | ~ | ~ | ~ |
| #1000 | 0 | 0 | — | — | — | — | — | — | — | — | — | — |

"—" : UNDEFINED (E.G., 0)

TIME SYNCHRONIZATION METHOD IN CDMA SYSTEM

BACKGROUND OF THE INVENTION

This invention relates to a method of synchronizing time in a CDMA system and, more particularly, to a time synchronization method for synchronizing the time of a plurality of base stations and the time of a base station controller that controls these base stations in a CDMA system.

In an IS-95—based N-CDMA (Narrow-band Code Division Multiple Access) system, it is required that signals transmitted from all base stations be synchronized in time (to within ±3 µs of absolute time) for the following two reasons:

(1) In an N-CDMA system, a base station is identified by the phase offset of a pilot PN sequence, which is a code string, where PN stands for pseudo-random noise. If base stations are not synchronized in time, the phase offset cannot be stipulated and a terminal such as a cellular telephone will not be able to identify the base station.

More specifically, signals transmitted from each base station to a mobile terminal include a pilot signal and a synchronizing signal, and each base station transmits these signals upon spreading and modulating the signals by a pilot PN sequence. Though the pilot PN sequence code string used is itself the same for each base station, each base station is provided with a different phase offset (a 64-chip unit) so that the mobile terminal can identify the particular base station. (A maximum of 512 base stations can be identified.) The reference for the phase offset is CDMA system time. In regard to a pilot PN sequence for which the phase offset is 0 (zero), the standard is that 15 consecutive "0" s followed by a "1" be output at time 00:00:00 on Jan. 6, 1980 (the moment at which the changeover from 0 to 1 is made is time 00:00:00). Unless the base stations are synchronized in time, therefore, it is not possible to stipulate the phase offset of the pilot PN sequence and, as a result, it will not be possible for a mobile terminal to identify to which base station it is wirelessly connected.

(2) In order to avoid transmission line congestion and a fluctuation in transmission delay that accompanies such congestion in an N-CDMA system, phase offsets are imposed on the traffic channels (a traffic channel is a channel for voice signals between a mobile terminal and a base station) in steps of 1.25 ms on a per-call basis. If base stations are not synchronized to one another in terms of time, therefore, it will no longer be possible to implement soft handoff between base stations, soft handoff being a characterizing feature of an N-CDMA system. (Soft handoff is the ability of a mobile station to move from one base station to another without an interruption in service.)

More specifically, an example of a signal sent and received between each base station and a mobile terminal is a voice signal transmitted via a traffic channel. In order to avoid the effects of congestion, delay and a fluctuation in delay time in the transmission lines between base stations and a base station controller and between the base station controller and switching equipment or the like, phase offsets are allocated to the voice signals in steps of 1.25 ms per call on each traffic channel. Since a 20-ms frame is partitioned into units of 1.25 ms, in such case there will be 16 offsets.

FIG. 7 is a diagram useful in describing the necessity of a phase offset. Shown in FIG. 1 are a base station controller 1, a base station 2 and mobile terminals $5_1, 5_2, \ldots, 5_n$ currently communicating with the base station 2. Though data transmission from each terminal is illustrated in the form of bursts in order to make it easier to visualize operation, in actuality the data is transmitted continuously or discretely along the time axis. When voice signals from the terminals $5_1, 5_2, \ldots, 5_n$ arrive at the base station 2 at the same timing, as shown in FIG. 7, the signals are queued because there is only one transmission line between the base station 2 and the base station controller 1. As a consequence, a certain signal will be sent from the base station 2 to the base station controller 1 late in terms of the numerical order. For example, in terms of the numerical order, a voice signal n is sent late at a timing a in FIG. 7, and a voice signal 1 is sent late at a timing b. If the queuing time and the numerical order are always constant, no problems arise. However, since the terminals move, a slight disparity develops in the order in which the voice signals arrive at the base station 2. When the order of signal arrival differs, the order in which signals are sent from the base station to the base station controller 1 also changes and, as a result, a large variation in transmission delay time is produced. For this reason the 1.25-ms offset is set for each call and only two to three terminals are allocated to one offset to prevent a large fluctuation in transmission time.

Hitless handoff (soft handoff) between base stations under the control of the same base station controller is possible on the condition that the radio frequency before and after handoff is the same and, moreover, that the phase offset allocated to the traffic channels is the same. If the radio frequency is different, an interruption in service will be unavoidable owing to the frequency changeover. If the phase offset is different, this will result in a long standby time at a voice decoder or the like and eventually lead to an interruption in service. It should be noted that one item of voice data should be receivable in 20 ms and that any fluctuation is less than 1.25 ms at most.

Unless the base stations are synchronized in time, therefore, specifying the same offset before and after handoff will be meaningless and hitless soft handoff will be impossible to accomplish.

In view of reasons (1) and (2) set forth above, a first CDMA system according to the prior art is such that a highly accurate GPS receiver (having a time error on the order of ±0.1 µs) is deployed at all base stations and the circuitry in each base station is actuated based upon time information and a clock signal received from GPS satellites.

With a second CDMA system according to the prior art, namely the system disclosed in the specification of Japanese Patent Application Laid-Open (KOKAI) No. 8-265838, a GPS clock output by a highly accurate GPS receiver deployed at a base station controller is adopted as a master clock and base stations are kept in frequency and time synchronization taking into account the transmission delay time between the base station controller and each base station. According to this second CDMA system, the transmission delay time is measured immediately prior to the sending and receiving of voice signals.

The first CDMA system according to the prior art is disadvantageous owing to the high cost of the base stations and system overall. The high-precision GPS receiver is costly (several hundred thousand yen) and a redundant configuration is necessary in order to reduce base station downtime due to failure. Furthermore, since an inexpensive GPS receiver has a time error on the order of 2 to 3 µs, such a receiver cannot meet the system specifications.

The second CDMA system according to the prior art is capable of maintaining the time and phase synchronization between the base station controller and base stations but a problem that arises is that the base stations themselves cannot achieve time synchronization to absolute time (or to a specific time standard). Further, the second CDMA system is such that transmission delay time is not measured periodically but only just prior to sending/receiving of a voice signal (voice communication). This means that the system cannot deal with a situation in which the transmitting apparatus re-synchronizes for some reason or in which the apparatus recovers after the occurrence of a failure.

SUMMARY OF THE INVENTION

Accordingly, an object of the present invention is to provide a time synchronization method through which the time of all base stations can be synchronized to absolute time highly accurately without providing each base station with a GPS receiver, i.e., by a low-cost arrangement.

Another object of the present invention is to provide a time synchronization method through which communication can be performed correctly by synchronizing transmitted signals from all base stations in a highly accurate manner.

A further object of the present invention is to provide a time synchronization method through which the time of all base stations can be synchronized to absolute time, resulting in that a signal to be transmitted can be transmitted upon synchronizing it to a transmitted signal from another base station even if a transmitting apparatus performs re-synchronization for some reason or recovers after the occurrence of a failure.

In accordance with the present invention, the foregoing objects are attained by providing a time synchronization method for synchronizing the time of a plurality of base stations in a CDMA system and the time of a base station controller that controls each of these base stations, comprising the steps of (1) providing the base station controller with a GPS receiver for receiving a signal from GPS satellites and generating a reference time based upon the received signal; (2) adopting the reference time generated by the GPS receiver as the time of the base station controller, generating time reference information based upon the said time and sending the time reference information to each base station; and (3) synchronizing the time of each base station to the time of the base station controller based upon the time reference information received by each base station. In other words, only the base station controller is provided with a GPS receiver, time reference information is sent from the base station controller to each base station and the time of each base station is synchronized to the time of the base station controller. This makes it possible to synchronize the time of all base stations to absolute time highly accurately through an inexpensive arrangement. In addition, since absolute time can be made the same at all base stations, signals to be transmitted from each of the base stations can be transmitted upon being synchronized highly accurately and it is possible to perform communication that does not cause transmission line congestion and a fluctuation in transmission delay that accompanies it.

Further, the base station controller periodically transmits, to each base station as the time reference information, data for specifying the reference time and time correction data for each base station, and the base station uses the reference time specifying data and the time correction data to correct its own time to that of the base station controller. If this arrangement is adopted, the time in the base station can be synchronized momentarily even if the base station re-synchronizes for some reason or recovers after the occurrence of a failure, and the signal to be transmitted can be transmitted upon achieving synchronization with transmitted signals from other base stations.

In this case the base station controller measures the transmission delay time from the base station controller to a base station, based upon the frame timing of a signal transmitted to the base station and the frame timing of the signal received from each base station, creates time correction data proper to each base station, using this transmission delay time and transmits the time correction data to each base station. Each base station then corrects its own time to that of the base station controller using the reference time specifying data and time correction data.

Further, the base station controller measures the transmission delay time from the base station controller to a base station based upon the frame timing of a signal transmitted to the base station and the frame timing of the signal received from the base station, adds this transmission delay time to the reference time to create the time reference information and then transmits the time reference information to each base station. Each base station then synchronizes its own time to that of the base station controller based upon the time reference information that has been received.

Further, the base station controller measures, every n frames, the transmission delay time from the base station controller to a base station based upon the frame timing of a signal transmitted to the base station and the frame timing of the signal received from the base station, adopts a reference time that follows n frames as the reference time specifying data, adopts time obtained by subtracting the transmission delay time from the period of n frames as the time correction data, and transmits this reference time specifying data and time correction data to each base station. Upon elapse of time indicated by the time correction data, each base station makes its own time agree with the reference time indicated by the reference time specifying data.

Other features and advantages of the present invention will be apparent from the following description taken in conjunction with the accompanying drawings.

BRIEF DESCRIPTION OF THE DRAWINGS

FIG. 6 is a diagram useful in describing time information and time correction information based upon DL bits.

DESCRIPTION OF THE PREFERRED EMBODIMENT

(a) Overall Configuration of CDMA System

Figure 1:
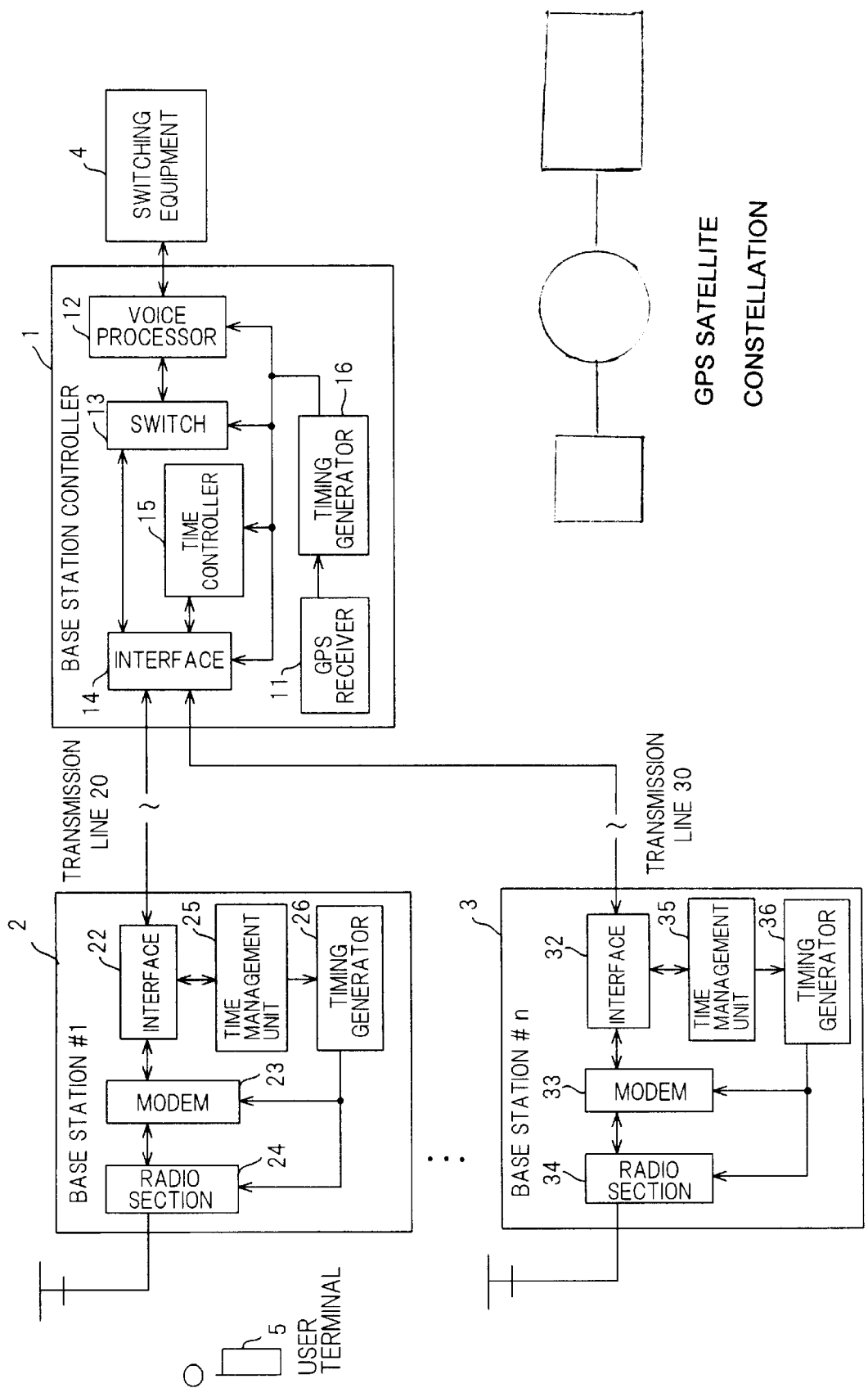
FIG. 1 is a block diagram showing the overall configuration of the present invention.

FIG. 1 is a block diagram showing the overall configuration of a CDMA system that includes a base station controller and a plurality of base stations (base station devices). Shown in FIG. 1 are the base station controller 1, which controls a plurality of base stations deployed in various areas; base stations 2, 3 deployed in respective areas for controlling/communicating with each of a plurality of user terminals (cellular telephones or the like); switching equipment 4 connecting the base station controller 1 and a communications network for switching voice signals and the like to a desired path; and a user terminal 5. The base station controller 1 and base station 3 are connected by a single transmission line 20, and the base station controller 1 and base station 3 also are connected by a single transmission line 30.

The base station controller 1 includes a GPS receiver 11 for generating a reference time internally of the unit and a clock signal based upon a GPS signal received from GPS satellites; a voice processor 12 for performing a conversion between voice coding (QCELP) over radio sections (namely between the user terminal and base station) and voice coding (PCM) in the switching network; a switch (SW) 13 for sending signals from the base stations 2, 3 to a prescribed port on the switching equipment 4 and for sending a signal from the switching equipment 4 to the prescribed base station; a base station interface 14 which executes interfacing processing for performing a signal format conversion between the base stations 2, 3 and switch 13; a time controller 15 for transmitting time information (reference time) to each base station, measuring transmission delay time of each base station, creating time correction information based upon the results of measurement and notifying each base station of the time correction information; and a timing generator 16 which, on the basis of the reference time and clock signal that enter from the GPS receiver 11, generates various timing signals necessary within the base station controller 1 and inputs these timing signals to the components 12 to 15.

The base station 2 includes an interface 22 for performing a signal conversion between the base station controller 1 and a modem 23; the modem 23, which is for modulating/demodulating (spreading/despreading; quadrature modulating / quadrature detecting; etc.) a call control signal and voice signal in accordance with the CDMA standard; a radio section 24 for converting a baseband signal output by the modem 23 to a high-frequency signal, amplifying the high-frequency signal and transmitting it from an antenna, and for subjecting a high-frequency signal received from the antenna to an operation that is the reverse of that performed at the time of transmission and inputting the resulting signal to the modem 23; a time management unit 25 for generating/managing time and reference timing within the base station 2 using reference time information and time correction information sent from the base station controller 1; and a timing generator 26 which, on the basis of reference timing input from the time management unit 25, generates various timing signals necessary within the base station 2.

The structure of the base station 3 is the same as that of the base station 2 and has components (an interface 32, a modem 33, a radio section 34, a time management unit 35 and a timing generator 36), whose operation is identical with those of the corresponding components 22 to 26, respectively, of the base station 2.

The interface 14 in base station controller 1 synchronizes signals, which are to be sent to the base stations 2, 3, to a timing signal that enters from the timing generator 16 and then transmits the signals over the transmission lines 20, 30. The timing signal is synchronized to the reference time output by the GPS receiver 11. The signals sent to the base stations 2, 3 include (1) the usual control signal and voice signal and, in addition (2) reference time information and time correction information needed to synchronize the base stations to the reference time. The time controller 15 detects the transmission delay time between the base station controller 1 and the base stations 2, 3 periodically and creates the time correction information using this transmission delay time.

The time management units 25, 35 of the base stations 2, 3 each generate time and reference timing within the respective base stations 2, 3 based upon the reference time information and time correction information extracted from the signals sent from the base station controller 1. The timing generators 26, 36 generate various required timing signals and distribute these signals to the components 22 to 24, 32 to 34 within the respective base stations. The interfaces 22, 32 adjust, to prescribed values, the phases between signals received from the base station controller 1 and signals transmitted to the base station controller 1.

(b) Overview of Operation

The base station controller 1, which operates in synchronization with the time reference signal (reference time and clock signal) output by the GPS receiver 11, sends signals to the base stations 2, 3 in synchronization with the time reference signal and notifies the base stations 2, 3 of the reference time information and time correction information periodically.

Upon receiving the above-mentioned information from the base station controller 1, the base stations 2, 3 transmit signals to the base station controller 1 at prescribed time phases with respect to the received signals. As a result, the base station controller 1 measures the transmission delay time between the base station controller 1 and the base stations 2, 3, based on the timing at which the signals are transmitted to the base stations and the timing at which the corresponding signals are received from the base stations.

Further, the base stations 2, 3 extract the reference time information and time correction information from the signals received from the base station controller 1 and, on the basis of the extracted information, make their own internal time coincide with the reference time internally of the base station controller 1.

Thus, since each of the base stations 2, 3 is capable of reproducing the same reference time as that of the base station controller 1, it is possible to operate all base stations 2, 3 in an accurately time-synchronized state. Further, the base station controller 1 measures the transmission delay time between itself and the base stations 2, 3 periodically. Even if a failure should happen to occur in the transmission lines between the base station controller 1 and base stations 2, 3, the reference time can be reproduced on the side of the base stations 2, 3 immediately after recovery, thus making communication possible.

(c) Details of Base Station Structure

Figure 2:
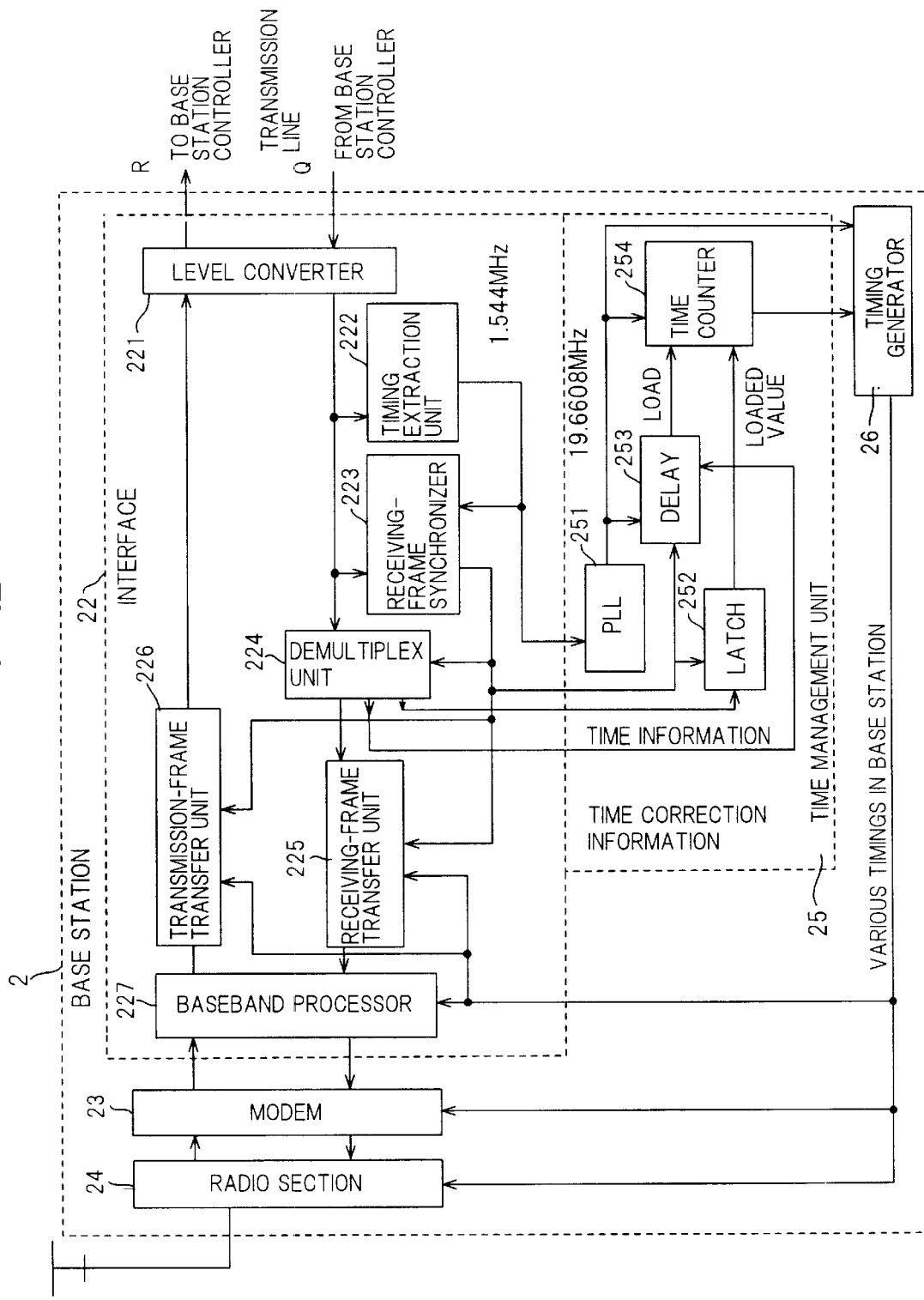
FIG. 2 is a block diagram of a base station.

FIG. 2 is a detailed block diagram of a base station, in which components identical with those shown in FIG. 1 are designated by same reference characters. Though the structure of the base station 2 is shown in FIG. 2, it should be noted that the base station 3 has exactly the same structure.

As shown in FIG. 2, the interface 22 has a level converter 221 for converting the electrical levels of transmission-line signals R, Q and of signals within the base station 2. A timing extraction unit 222 extracts a clock component (e.g., 1544 kHz) from the transmission-line signal Q sent from the base station controller 1. A receiving-frame synchronizer 223 acquires the frame timing of the transmission-line signal Q sent from the base station controller 1. A demultiplex unit 224 extracts the reference time information and time correction information sent from the base station controller 1, inputs these items of information to the time management unit 25, and inputs the voice signals and the like to a receiving-frame transfer unit 225. The receiving-frame transfer unit 225 transfers from the received frame timing on the transmission line Q to the frame timing within the base station 2. The frame timing within the base station 2 is synchronized to the time generated by the time management unit 25 and is delivered as the output of the timing generator 26. A transmission-frame transfer unit 226 transfers from the frame timing within the base station 2 to the transmission frame timing on the transmission line R. This unit assembles a transmission frame based upon a prescribed phase difference (e.g., a phase difference of zero) with a received frame from the base station controller and transmits the frame to the base station controller 1. A baseband processor 227 performs an operation such as signal termination, data format conversion and so on.

The time management unit 25 includes a PLL 251 for obtaining a higher frequency (e.g., 19.6608 MHz) phase-synchronized to the clock component (1544 kHz) extracted by the timing extraction unit 222. This is same frequency as that used to obtain the time correction information, etc., in the base station controller 1. A latch circuit 252 temporarily latches the time information (reference time) extracted by the demultiplex unit 224. The time information (reference time) is eventually loaded into a time counter 254 (described later). A delay circuit 253 delays the received-frame timing, which is acquired by the receiving-frame synchronizer 223, by a certain period of time indicated by the time correction information extracted by the demultiplex unit 224. The delay circuit 253 loads the time information (reference time) in the time counter 254 at the delayed timing. The time counter 254 performs timekeeping within the base station 2. Adopting the above-mentioned loaded value as the initial value, the time counter 254 then counts the 19.6608-MHz clock output by the PLL 251. As a result, time synchronized to the reference time of the base station controller 1 can be kept track of by the base station 2 using the time counter 254.

Thus, the base stations 2, 3 operate at a timing synchronized to the clock signal, which is extracted from the transmission-line signal Q that enters from the transmission lines 20, 30, and can produce a timing synchronized to the reference time of the base station controller 1. This makes possible operation in which all base stations 2, 3 are synchronized. Further, each of the base stations 2, 3 is capable of sending a transmission frame to the base station controller 1 at a prescribed, fixed phase difference with respect to the phase of frames received from the base station controller 1. As a consequence, it is possible for the base station controller 1 to measure transmission delay time, as will be described below.

(d) Structural Details of Base Station Controller

Figure 3:
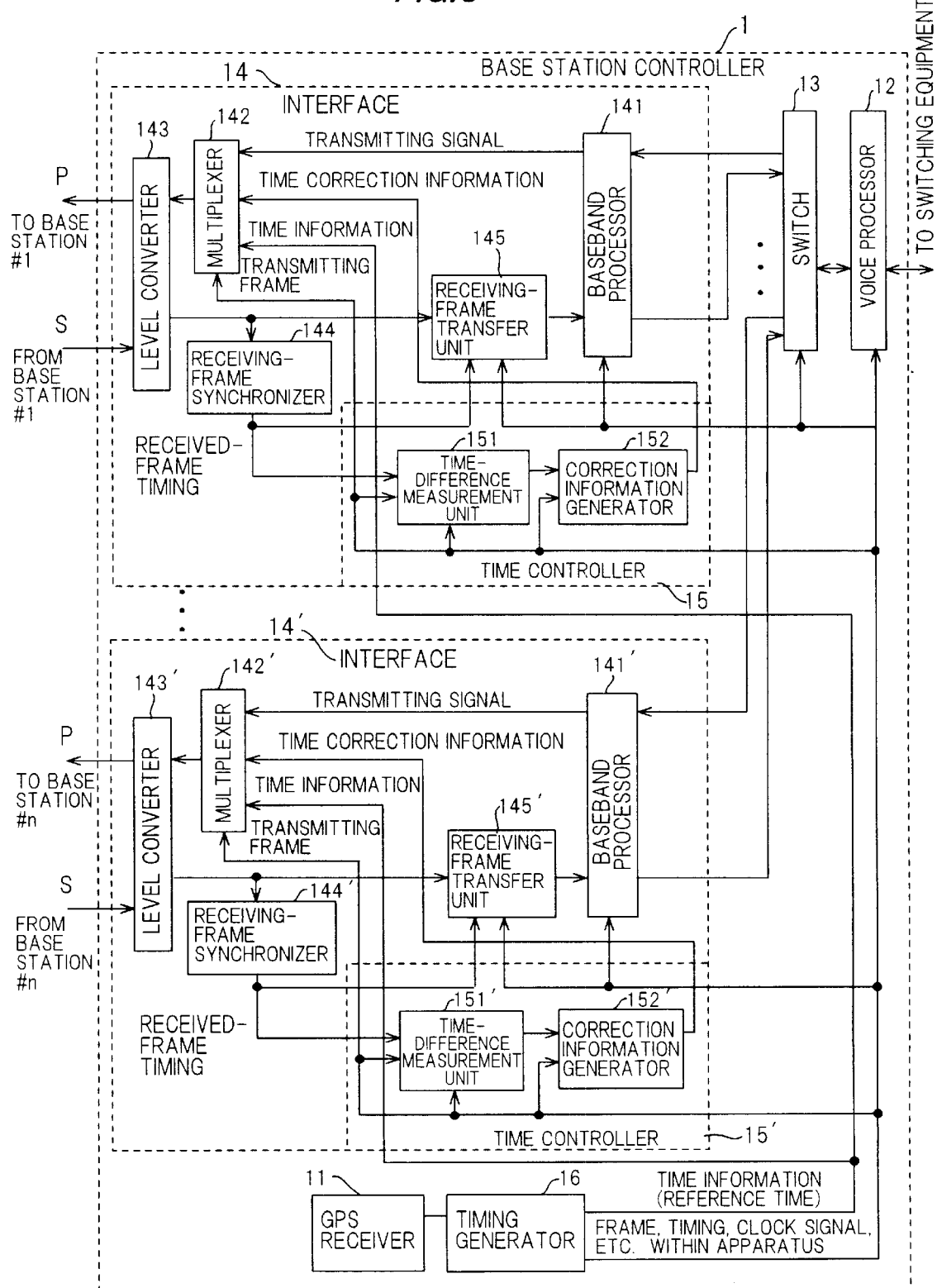
FIG. 3 is a block diagram of a base station controller.

FIG. 3 is a detailed block diagram of the base station controller 1, in which components identical with those shown in FIG. 1 are designated by same reference characters. The base station controller 1 is provided with identically constructed interfaces 14, 14' corresponding to the base stations 2, 3, respectively.

The interfaces 14, 14' respectively have baseband processors 141, 141' for terminating signals; multiplexers 142, 142' for multiplexing the time information (reference time) output by the timing generator 16 and the time correction information output by time controllers 15, 15' onto the original signals to be transmitted; level converters 143, 143' for converting the electrical levels of transmission-line signals P, S and of signals within the base station controller 1; receiving-frame synchronizers 144, 144' for acquiring the frame period included in the transmission-line signals S sent from the base stations 2, 3; and receiving-frame transfer units 145, 145' for transferring from the frame timing on the transmission line S to the frame timing within the base station controller 1, i.e., to the timing synchronized to the reference time generated by the GPS receiver 11.

The time controllers 15, 15' have time-difference measurement units 151, 151', respectively, for measuring the time differences between the frame timing (the frame timing within the apparatus) at which signals are transmitted to the base stations 2, 3 and the frame timings at which signals are received from these base stations. The time differences are measured using a comparatively high-frequency clock of, say, 19.6608 MHz. In order for the time correction information to be generated based upon the time difference, a clock having the same frequency of 19.6608 MHz synchronized to this clock is used in the base stations 2, 3 as well. Though a method of measuring time difference using frame timing as the reference is described here, it is also possible to measure time difference using an existing marker whose period is longer than that of a frame or a multiframe (e.g., 3 ms) in case that the transmission line and its delay is long.

The time controllers 15, 15' further include correction information generators 152, 152', respectively, for calculating one-way transmission delay time from the time differences measured by the time-difference measurement units 151, 151', respectively, namely from the transmission delay time (round-trip delay+time offset on the base station side) from the base station controller 1 to the base stations 2, 3, and for generating correction information based upon the one-way transmission delay time. (This will be described later in detail.)

By virtue of this arrangement, the base station controller 1 can send signals to the base stations 2, 3 in sync with the reference time extracted by the GPS receiver 11 in the base station controller 1, measure the delay in transmission from the base station controller 1 to the base stations 2, 3 and send time information and time correction information to the base stations 2, 3.

Figure 4:
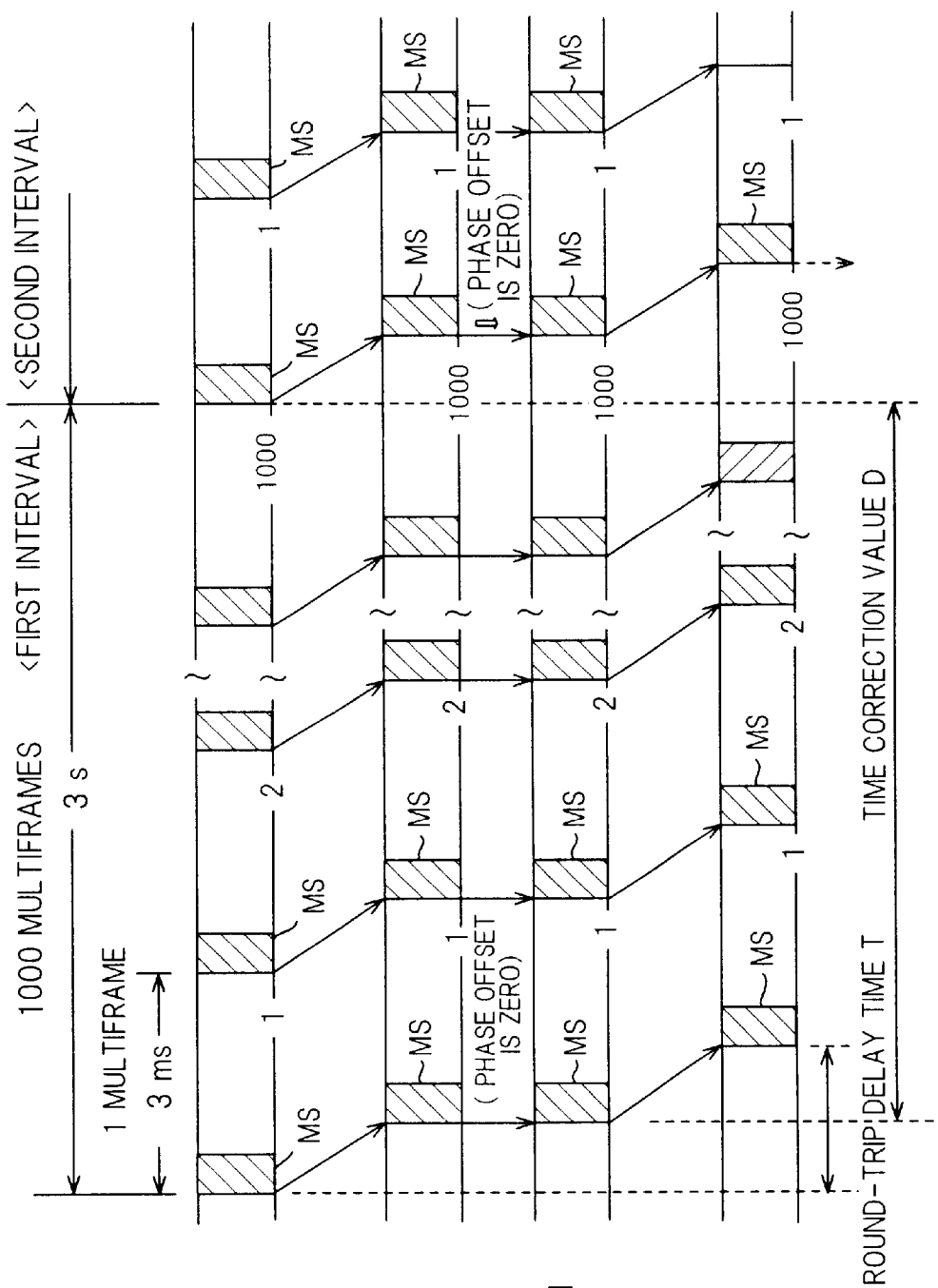
FIG. 4 is a diagram useful in describing measurement of transmission delay time and a method of giving notification of time information and time correction information.

(e) Measurement of Transmission Delay and Method of Notifying of Time Information and Time Correction Information FIG. 4 is a diagram useful in describing measurement of transmission delay between the base station controller 1 and base stations 2, 3 and a method of giving notification of the time information and time correction information.

In FIG. 4, the character P represents a transmitting signal from the base station controller 1 to the base stations 2, 3; Q a receiving signal at the base stations 2, 3; R a transmitting signal from the base stations 2, 3 to the base station controller 1; and S a receiving signal at the base station controller 1. The frame length of these signals is 125 $\mu$s, a 3-ms multiframe is formed by 24 frames, and a multiframe synchronizing code MS is inserted into the beginning of each multiframe. An interval of 3 s is formed by 1000 multiframes, transmission delay time is measured every 3 seconds and the time of the base stations 2, 3 is synchronized to the reference time of the base station controller 1.

The multiframe synchronizing code MS of the signal P transmitted from the base station controller 1 to the base stations 2, 3 is utilized to detect transmission delay time. The base stations 2, 3 operate in such a manner that the phase difference between the multiframe of the signal Q received from the base station controller 1 and the multiframe of the signal R transmitted to the base station controller 1 is kept at a predetermined value (the phase difference is equal to zero in the illustration).

The time-difference measurement units 151, 151' of the base station controller 1 detect the multiframe timing of the signal S received from the base stations 2, 3 and measure the time difference T between the multiframe timing of the signal S and the multiframe timing of the transmitted signal P. Since the measurement resolution is too low when using the clock (e.g., 1544 kHz) of the transmission line, the high-frequency clock (e.g., 19.6608 MHz), used in the base station controller 1, is employed to improve the resolution. The time difference T measured by the time-difference measurement units 151, 151' is the round-trip delay time associated with the transmission line. Accordingly, the correction information generators 152, 152' adopt half of this value as the one-way transmission delay time, create time correction information using this transmission delay time and output the time correction information. It should be noted that when the phase offset between the signals Q and R is not zero, then half of a value obtained by subtracting this phase offset from the above-mentioned time difference will serve as the one-way transmission delay time.

Next, by using the synchronizing code MS of the multiframe at the beginning of an interval as the reference, the items of time information (reference time) and time correction information are sent to the base stations 2, 3 on a per-interval basis (i.e., every 1000 multiframes). The time information indicates the starting time of the next interval; for example, the time information in the interval 1 of FIG. 4, indicates the starting time of the interval 2. The time correction information indicates the time D, which is obtained by subtracting T/2, namely the one-way transmission delay time, from the interval time (=3 s). In other words, D [=(3 s)−(one-way transmission delay time)] is the time correction information. The multiplexers 142, 142' send the time information (the starting time of the next interval) and the time correction information to the base stations 2, 3 using the synchronizing code MS of the multiframe at the beginning of the interval. Though the details will be described later, the multiplexers actually send the time information and time correction information using the synchronizing codes MS of the leading 11 multiframes of an interval.

Thus, when the multiframe at the beginning of interval 1 is sent to the base stations 2, 3, the latch 252 of the time management unit 25 latches the time information (the starting time of the next interval) and the delay circuit 253 monitors whether the time D indicated by the time correction information has elapsed. If the elapsed time is equal to the time D, then the delay circuit 253 loads the starting time of interval 2 into the time counter 254. As a result, the time of the base stations 2, 3 will coincide with the reference time of the base station controller 1. By counting time using the 19.6608-MHz clock, it is possible to keep track of the same absolute time as that of the base station controller 1.

(f) Signal Format

Figure 5:
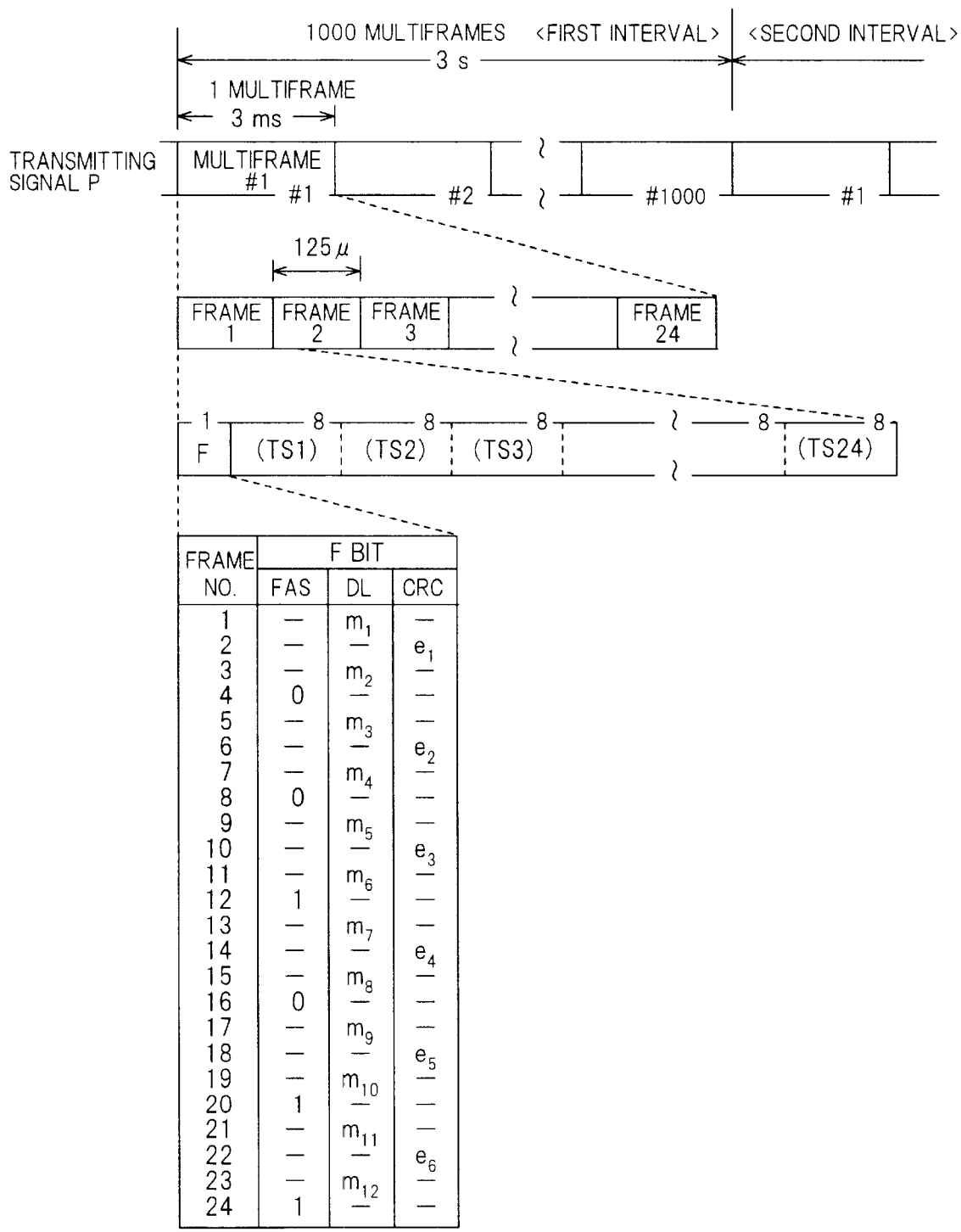
FIG. 5 is a diagram useful in describing signal format.
Figure 7:
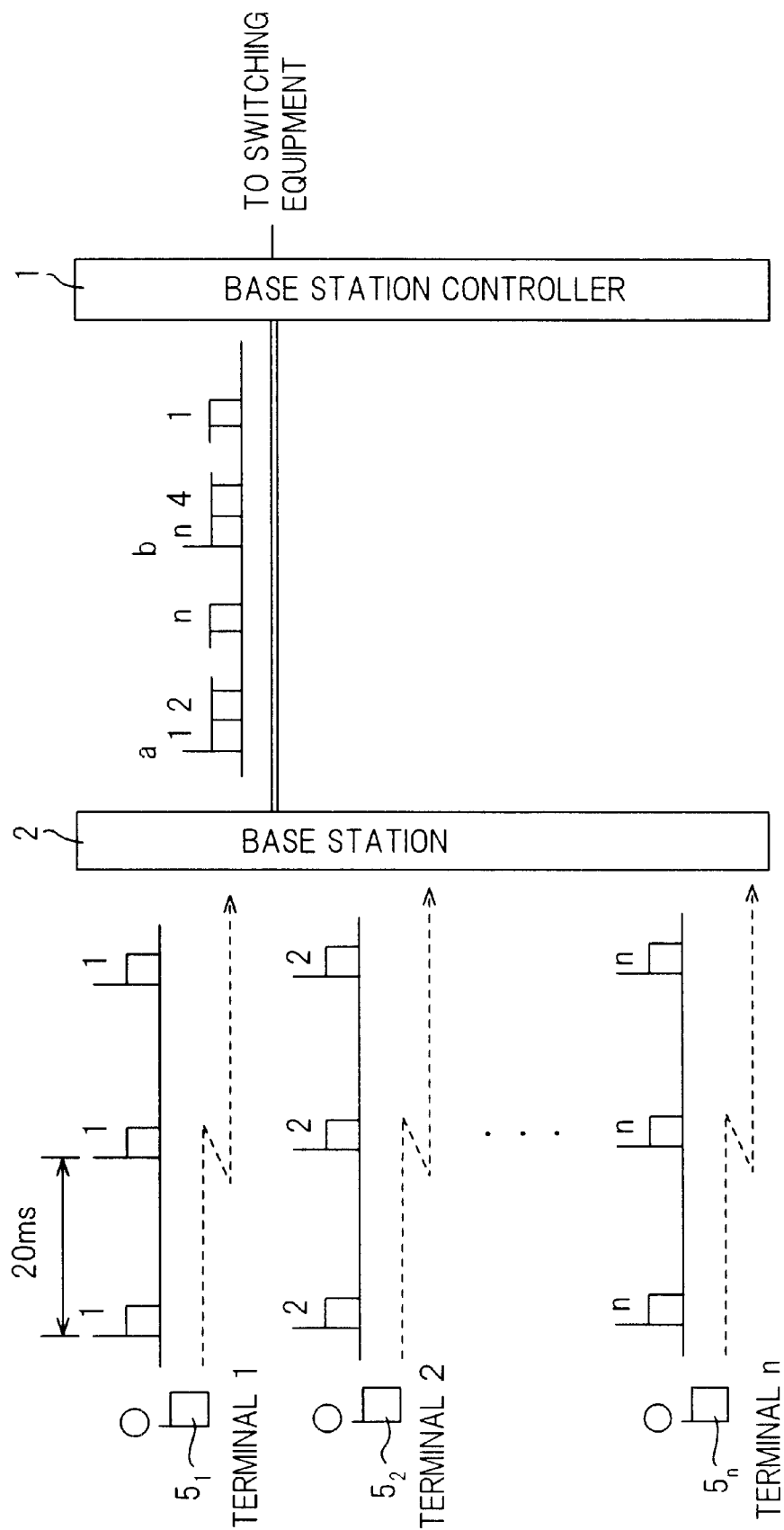
FIG. 7 is a descriptive view illustrating the necessity of phase offset.

FIG. 5 is a diagram useful in describing the format of signals sent and received between the base station controller 1 and base stations 2, 3, and FIG. 6 is a diagram useful in describing time information and time correction information based upon data bits (DL bits).

As shown in FIG. 5, the signal frame length is 125 µs, the 3-ms multiframe is formed by 24 frames, and interval of 3 s is formed by 1000 multiframes. One frame is composed of an F bit (one bit) and 24 time slots, and each time slot is composed of eight bits. The base station controller 1 and base stations 2, 3 transform the original communication signals (a voice signal, call control signal, etc.) into ATM cells, imbed the cells successively into the areas of TS1–TS24 (24 time slots) of this format and send the cells to the apparatus of the other party.

The 24 F bits of the 24 frames that constitute one multiframe form (1) synchronizing bits FAS for the multiframe, (2) DL bits for 4-kbps data and (3) CRC bits for performance monitoring. The multiframe synchronizing bits FAS are composed of six bits (001011), the data bits DL of 12 bits ($m_1$ to $m_{12}$) and the performance monitoring bits CRC of 6 bits ($e_1$ to $e_6$).

The time information and time correction information is sent using the DL bits of 11 multiframes at the beginning of an interval. The demarcation of the 1000 multiframes (one interval) is indicated by $m_1$, $m_2$. More specifically, the year, month, day, hour, minute and second of the time information (reference time) are carried by BCD codes using the data bits $m_3$ to $m_{10}$ of the first through seventh multiframes, and the time correction information is carried by binary codes using the data bits $m_3$ to $m_{10}$ of the eighth through eleventh multiframes. In regard to the time correction information, a value obtained by counting at the 19.6608-MHz clock is carried in the form of binary codes. That is, when one-way transmission delay time is 100 ms=1,966,080 clock pulses, time correction information will be D=3 s−100 ms=2.9 s=57,016,320 clock pulses and values $b_{31}$–$b_0$ obtained by the binary coding of 57,016,320 are carried as the data bits of the eighth to eleventh multiframes. It should be noted that $m_{11}$, $m_{12}$ of all multiframes and data bits $m_2$ to $m_{10}$ of the 12th to 1000th multiframes are "undefined") Here they are assumed to be "0" by way of example.

(g) Modification

In FIG. 4, synchronization of time is performed by adopting the starting time of the next interval as the time information and sending the time D obtained by subtracting the transmission delay time from the interval length to the base stations 2, 3 as the time correction information. However, it is also possible to adopt an arrangement of the kind described below.

Specifically, in this modification, the base station controller 1 adopts the starting time of the current interval as time information and sends the transmission delay time to the base stations 2, 3 as the time correction information. Upon receiving this information, the base stations 2, 3 correct the current time (starting time of the current interval+ transmission delay time) immediately to thereby synchronize the time to the reference time of the base station controller 1.

Further, the base station controller 1 sends the time obtained by adding the transmission delay time to the starting time of the current interval (namely starting time of the current interval+transmission delay time) to the base stations 2, 3 as the time reference information. The base stations 2, 3 correct their own time to the time indicated by the received time reference information, whereby the base stations 2, 3 are synchronized to the reference time of the base station controller 1.

Thus, in accordance with the present invention as described above, only a base station controller is provided with a GPS receiver, time reference information is sent from the base station controller to base stations and the time of each base station is synchronized to the time of the base station controller. As a result, the time of all base stations can be synchronized to the absolute time through an inexpensive arrangement. In addition, signals to be transmitted from the base stations can be synchronized to one another.

Further, in accordance with the present invention, reference time specifying data and time correction data for each base station are transmitted periodically from the base station controller to each of the base stations as time reference information, and each base station uses the reference time specifying data and time correction data to correct its own time to the time of the base station controller. As a result, the time in each base station can be synchronized momentarily even if a base station re-synchronizes for some reason or recovers after the occurrence of a failure, and the signal to be transmitted can be synchronized with transmitted signals from other base stations. This contributes to a reduction in the cost of the overall CDMA system and to a shortening of failure recovery time.

In accordance with the present invention, the base station controller measures the transmission delay time from the base station controller to a base station based upon the frame timing of a signal transmitted to the base station and the frame timing of a signal received from the base station, creates time correction data using this transmission delay time and transmits the time correction data to each base station. Each base station then corrects its own time to that of the base station controller using the reference time specifying data and time correction data. This makes it possible to accurately synchronize the time of the base station to the time of the base station controller.

In accordance with the present invention, the base station controller measures the transmission delay time from the base station controller to a base station based upon the frame timing of a signal transmitted to the base station and the frame timing of a signal received from the base station, adds this transmission delay time to the reference time to create the time reference information and then transmits the time reference information to each base station. Each base station then synchronizes its own time to that of the base station controller based upon the time reference information that has been received. This also makes it possible to accurately synchronize the time of the base station to the time of the base station controller.

In accordance with the present invention, the base station controller measures, every n frames, the transmission delay time from the base station controller to a base station based upon the frame timing of a signal transmitted to the base station and the frame timing of a signal received from the base station, adopts a reference time that follows n frames as the reference time specifying data, adopts time obtained by subtracting the transmission delay time from the period of n frames as the time correction data, and transmits this reference time specifying data and time correction data to each base station. Upon elapse of time indicated by the time correction data, each base station makes its own time agree with the reference time indicated by the reference time specifying data. This also makes it possible to accurately synchronize the time of the base station to the time of the base station controller.

As many apparently widely different embodiments of the present invention can be made without departing from the spirit and scope thereof, it is to be understood that the invention is not limited to the specific embodiments thereof except as defined in the appended claims.

What is claimed is:

1. A time synchronization method for synchronizing the time of a plurality of base stations in a CDMA system and the time of a base station controller that controls each of these base stations, comprising the steps of:

providing the base station controller with a GPS receiver for receiving signals from GPS satellites and generating a reference time based upon the received signals;

adopting the reference time generated by the GPS receiver as the time of the base station controller; and measuring a transmission delay time from the base station controller to each base station and regarding the transmission delay time as time correction data;

transmitting, from the base station controller to each base station, data for specifying said reference time and said time correction data for each base station; and in each base station, synchronizing the time of each base station to that of the base station controller based upon the received data for specifying said reference time and said time correction data for each base station.

2. The method according to claim 1, further comprising the steps of:

providing in each base station a phase offset between frame timing of a receiving signal from the base station controller and frame timing of a transmitting signal to the base station controller;

in the base station controller, measuring a transmission delay time from the base station controller to the base station based upon frame timing of a transmitting signal to the base station, frame timing of a receiving signal from the base station and said phase offset;

transmitting the transmission delay time from the base station controller to each base station as the time correction data; and in each base station, correcting the time of each base station to that of the base station controller based upon the reference time specifying data and the time correction data received from said base station controller.

3. The method according to claim 1, further comprising the steps of:

providing in each base station a phase offset between frame timing of a receiving signal from the base station controller and frame timing of a transmitting signal to the base station controller;

in the base station controller, measuring every predetermined number of frames, a transmission delay time from the base station controller to the base station based upon frame timing of a transmitting signal to the base station, frame timing of a receiving signal from the base station and said phase offset; and adopting a reference time that follows said predetermined number of frames as the reference time specifying data, adopting correction information, which is for correcting said reference time that follows the predetermined number of frames and is based upon the transmission delay time, as the time correcting data, and transmitting these items of data from the base station controller to each base station.

4. The method according to claim 3, further comprising the step of each base station making its own time agree with the reference time indicated by the reference time specifying data upon elapse of time indicated by the time correction data after the base station receives the reference time specifying data and the time correction data.

5. The method according to claim 1, further comprising the steps of:

providing in each base station a phase offset between frame timing of a receiving signal from the base station controller and frame timing of a transmitting signal to the base station controller;

in the base station controller, measuring a transmission delay time from the base station controller to the base station based upon frame timing of a transmitting signal to the base station, frame timing of a receiving signal from the base station and said phase offset; and adding this transmission delay time to the reference time to create the time reference information and transmitting this time reference information to each base station;

wherein each base station synchronizes its own time to that of the base station controller based upon the time reference information it has received.

6. A base station controller in a CDMA system which synchronizes the time of a plurality of base stations and the time of a base station controller that controls each of these base stations, comprising:

a GPS receiver for receiving a signal from GPS satellites and generating a reference time based upon the received signal;

a timing means for adopting the reference time generated by the GPS receiver as the time of the base station controller;

means for measuring a transmission delay time from the base station controller to each base station and generating time correction data based upon the transmission delay time; and transmitting means for transmitting, to each base station, data for specifying said reference time and said time correction data for each base station.

7. A base station in a CDMA system, said CDMA system synchronizes the time of a plurality of base stations and the time of a base station controller that controls each of the plurality of base stations, said base station comprising:

receiving means for receiving data for specifying reference time which is created based upon a signal received in the base station controller from GPS satellites and time correction data which is created based upon a transmission delay time from the base station controller to the base station; and synchronizing means for synchronizing the time of the base station to that of the base station controller based upon the received data for specifying said reference time and said time correction data.

* * * * *